UNITED STATES PATENT OFFICE.

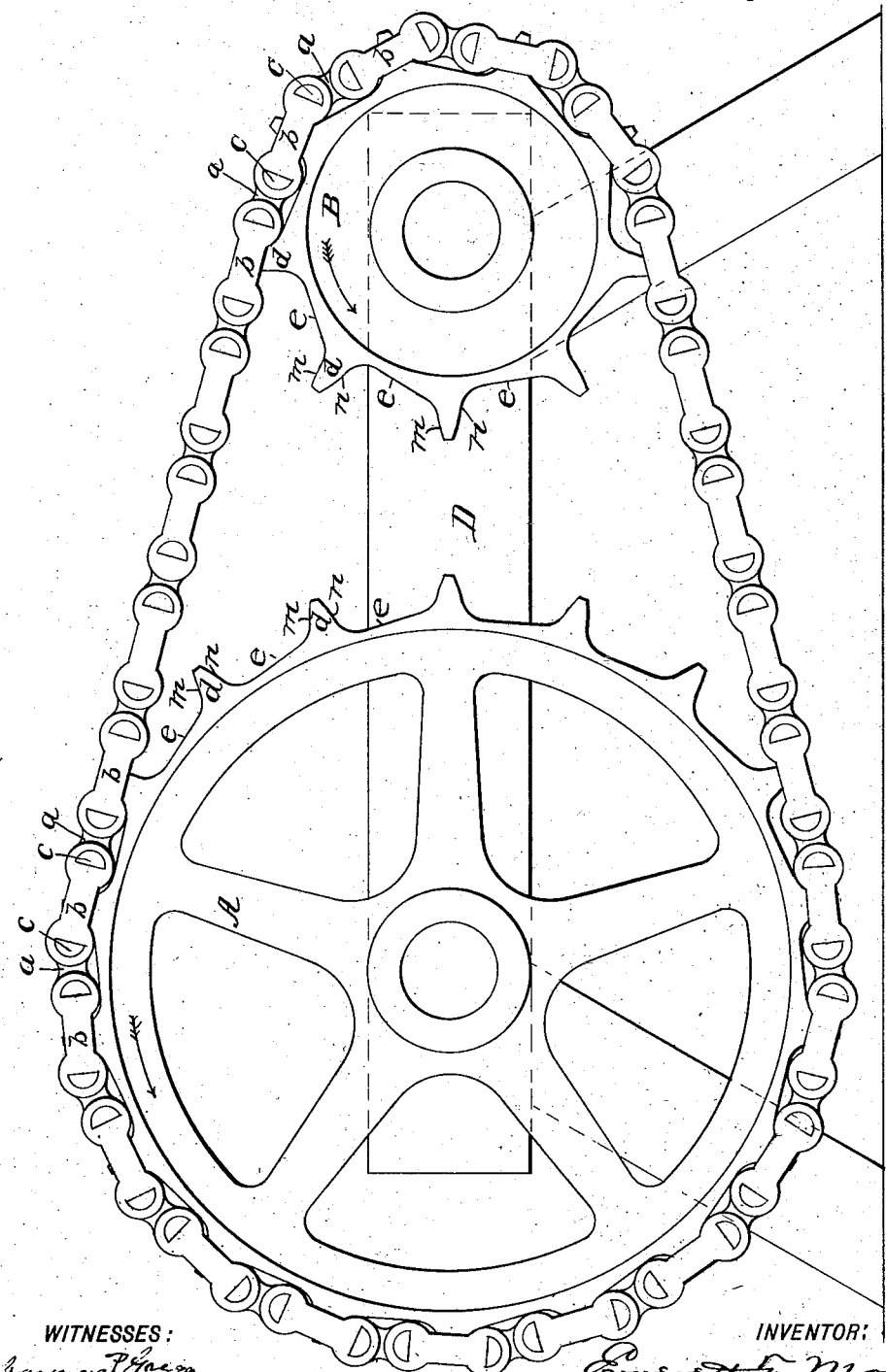

EVERETT F. MORSE, OF TRUMANSBURG, NEW YORK.

SPROCKET-AND-CHAIN GEAR.

SPECIFICATION forming part of Letters Patent No. 603,609, dated May 3, 1898.

Application filed March 3, 1894. Serial No. 502,172. (No model.)

*To all whom it may concern:*

Be it known that I, EVERETT F. MORSE, a citizen of the United States, residing at Trumansburg, in the county of Tompkins and State of New York, have invented certain new and useful Improvements in Sprocket-and-Chain Gearing, of which the following is a specification, reference being had to the drawing accompanying and forming part of the same.

My invention resides in a novel form of sprocket-and-chain gear in which the solid or center links of the drawing fold of the chain, or those which occupy the interdental spaces on the sprockets, do not turn relatively to the periphery of the sprocket-wheel, but are laid upon and lifted off from seats provided for them on the periphery of the wheel without sliding friction between said links and the wheel.

The object of the invention is to reduce the friction between the chain and sprocket-wheel and at the same time to increase the durability of both. I attain these objects by the construction shown in the drawing hereto annexed, which is a side elevation of two sprocket-wheels and a driving-chain constructed and combined in accordance with my invention.

In the said drawing, A is the driving and B the driven sprocket-wheel, adapted to run in the direction indicated by the arrows. Under such conditions the upper fold of the chain is the drawing side.

D represents any suitable framework for supporting the sprocket-wheels. The driving-chain is any common form of what is known as the "Humber" pattern or type of chain and which is composed of alternately solid or center and open or side links with pivotal connections $c$ of any ordinary kind and of such character relatively to the wheel that the center or solid links enter between the teeth $d$, where they are received in the seats $e$, which are provided between said teeth, while the side links $d$, which lap the center links on either side, embrace the teeth as the chain passes around the sprocket-wheel.

$m\ m$ are the working faces of the teeth, against which the center links $a$ of the chain press in transmitting power. $n\ n$ are the opposite or idle faces of the teeth $d$.

The novel feature of my sprocket-and-chain gearing consists in providing for the center links seats $e$ between the teeth of the sprocket-wheel, which will maintain such links in such positions relatively to the side links as to prevent in the movement of the chain rubbing friction between the solid links and the periphery of the wheel, and for this purpose I incline the peripheral portions of the wheel between the teeth at an angle to a circle passing through them and described about the center of the sprocket-wheels. The end of each seat $e$ adjacent to the idle faces $n$ of the teeth $d$ is nearer the center of the wheel than the opposite end. The effect of this construction is to permit each of the center links $a$ while passing around the wheels to assume a position in line with the side links joined to it at the end adjacent to the idle faces $n$ of the teeth. As the successive links in the upper or driving fold of the chain mount or leave the sprocket-wheel the side links only turn relatively to the wheel, and they turn about the joint in the center links adjacent to the working face of the teeth; but as the side links do not bear against the sprocket-wheel the friction between the chain and the wheel is thus greatly reduced.

While I have shown the seats $e$ as plain surfaces between the bases of the teeth, it is evident that seats of various shapes can be used in carrying out my improvement, the only essential feature being the relative distances of the opposite ends of the said seats from the center of the wheel.

What I claim as my invention is—

1. The combination of a sprocket-wheel and a sprocket-chain composed of open and solid links, the solid links entering between the teeth and the wheel having seats for the alternate links to rest upon, arranged around its periphery, said seats being inclined at an angle to a circle passing through them and described about the center of the wheel, as described.

2. The combination of a sprocket-wheel and a sprocket-chain composed of open and solid links, the solid links entering between the teeth, and the wheel having seats between its teeth for the alternate links of said chain, said seats being inclined to a circle passing through them and concentric with the wheel, the ends of said seats adjacent to the working faces of the teeth being more remote from the center of the wheel than the opposite ends, substantially as described.

3. The combination of a sprocket-wheel and a sprocket-chain composed of open or side and solid or center links, the solid links entering between the teeth, and the wheel being cut or formed between each two teeth with a peripheral supporting-surface for the end of the solid link adjacent to the working face of the tooth, and a peripheral cutaway or relatively lower portion under the other or idle end of the solid link whereby the said idle end will lie in a straight line joining the working faces of the said two teeth, and out of frictional contact with the periphery of the sprocket, as set forth.

4. The combination of a sprocket-wheel and a sprocket-chain composed of open or side and solid or center links, the solid links entering between the teeth, and the wheel being formed or provided with raised bearing-surfaces adjacent to the working faces of the teeth, which support the working ends of the solid links and maintain their opposite or idle ends out of contact with the periphery of the wheel and prevent rubbing friction between the sprocket and the chain, as set forth.

EVERETT F. MORSE.

Witnesses:
FRANK L. MORSE,
CHAUNCEY P. GREGG.